United States Patent
Lee

(10) Patent No.: US 7,260,419 B2
(45) Date of Patent: Aug. 21, 2007

(54) METHOD FOR DISPLAYING CALL RECORD LIST IN WIRELESS TELECOMMUNICATION TERMINAL

(75) Inventor: Myung-Jae Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 136 days.

(21) Appl. No.: 11/007,603

(22) Filed: Dec. 7, 2004

(65) Prior Publication Data

US 2005/0085274 A1   Apr. 21, 2005

(30) Foreign Application Priority Data

Dec. 8, 2003   (KR)   .................... 10-2003-0088563

(51) Int. Cl.
*H04M 1/00* (2006.01)
(52) U.S. Cl. .................. 455/566; 455/412.1; 455/406; 379/355.06; 379/355.07; 379/355.08
(58) Field of Classification Search ................ 455/566, 455/412.1, 406; 379/355.06, 355.07, 355.08, 379/355.09, 355.1

See application file for complete search history.

(56) References Cited

U.S. PATENT DOCUMENTS 6,961,420 B2 *  11/2005  DeSalvo ................ 379/355.02
2002/0037754 A1 *  3/2002  Hama et al. ................ 455/566
2003/0195018 A1 *  10/2003  Lee ............................ 455/566

FOREIGN PATENT DOCUMENTS

| KR | 10-2002-0096578 | | 12/2002 |
| KR | 1020020096578 | * | 12/2002 |
| KR | 10-2003-0037832 | | 5/2003 |

* cited by examiner

*Primary Examiner*—Lester G. Kincaid
*Assistant Examiner*—Dung Lam
(74) *Attorney, Agent, or Firm*—Knobbe Martens Olson & Bear LLP

(57) ABSTRACT

A method for displaying a call record list in a wireless telecommunication terminal is disclosed. The method includes the steps of: reading a stored call record in response to a call record list searching request; collecting call records having identical caller information in form of a list in sequence of time; and displaying caller information together with more than one icon of the call records.

18 Claims, 4 Drawing Sheets

FIG. 3
(PRIOR ART)

CALL RECORD LIST

1. ☎ LEE MYUNG JAE
2. ✉ HONG GIL DONG —31
3. ☎ 010-1234-5678
4. ✉ HONG GIL DONG —32
5. ☎ 010-2335-1234
6. ☎ 010-555-3424
7. ✉ HONG GIL DONG —33
8. ☎ PANTECH

[DESCRIPTION]   [NEXT]

CALL RECORD LIST

1. ☎✉ LEE MYUNG JAE —511
2. ✉✉✉ HONG GIL DONG —512
3. ☎ 010-1234-5678
4. ✉ 010-2335-1234
5. ☎ 010-555-3424
6. ☎ PANTECH
7. ✉ JACK
8. ☎ 010-333-3333

[DESCRIPTION]   [NEXT]

52

CALL RECORD LIST

1. ☎✉ LEE MYUNG JAE
2. ✉$^2$✉  HONG GIL DONG
3. ☎ 010-1234-5678
4. ✉ 010-2335-1234
5. ☎ 010-555-3424
6. ☎ PANTECH
7. ✉ JACK
8. ☎ 010-333-3333

[DESCRIPTION]   [NEXT]

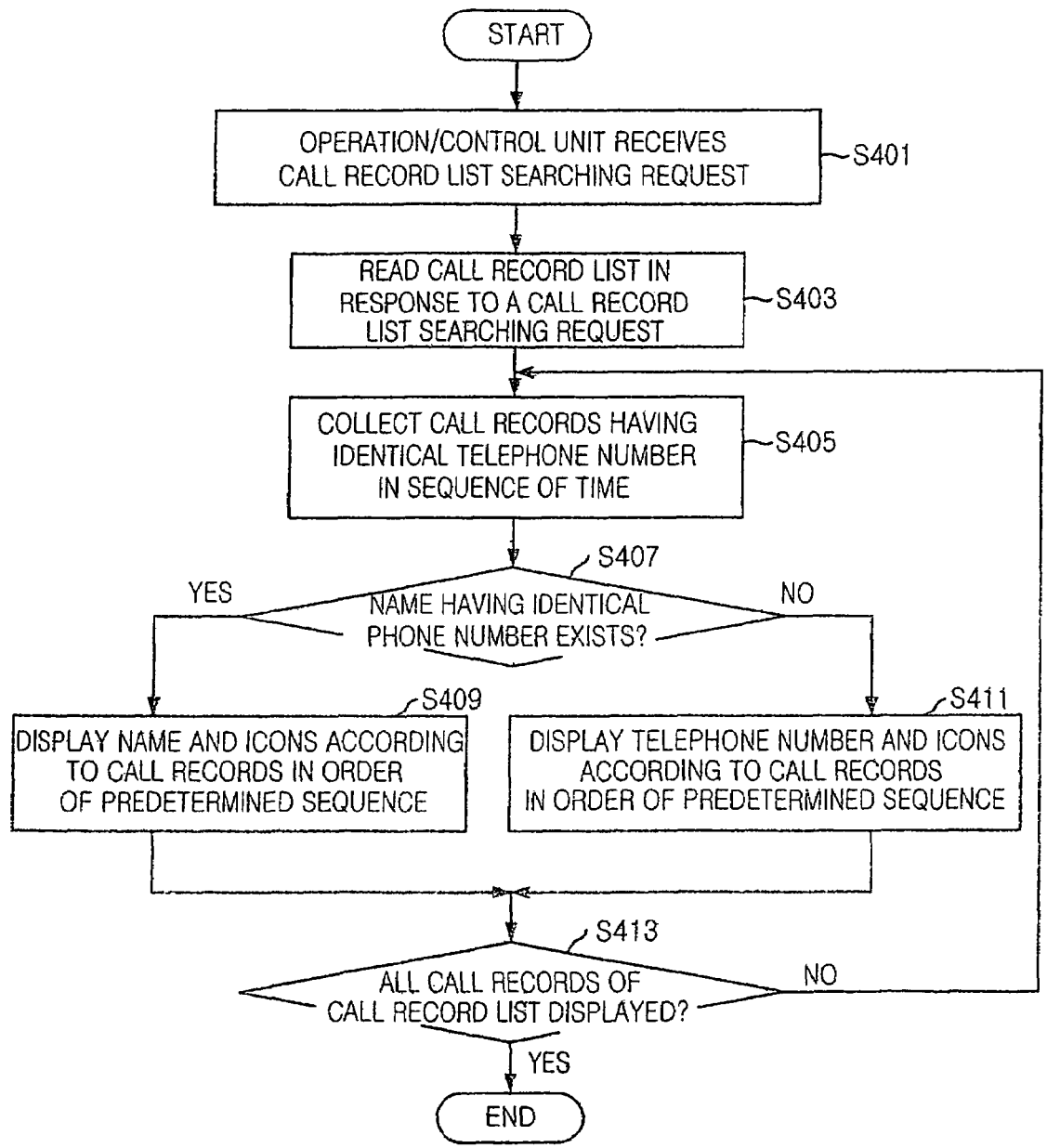

METHOD FOR DISPLAYING CALL RECORD LIST IN WIRELESS TELECOMMUNICATION TERMINAL

FIELD OF THE INVENTION

The present invention relates to a method for displaying a call record list in a wireless telecommunication terminal.

DESCRIPTION OF RELATED ART

In the present invention, the wireless telecommunication terminal (hereinafter, refer to as a wireless terminal) means a terminal which is portable and can telecommunicate in wireless telecommunication system, e.g., a mobile telecommunication terminal, a personal communication services (PCS), a personal digital assistant (PDA), a smart telephone, an international mobile telecommunication-2000 (IMT-2000) and a wireless local area network (LAN) terminal, etc.

Generally, a call record list displaying function, which displays information related to an outgoing call or an incoming call in sequence of time, is built in the wireless terminal. For performing the call record list displaying function, the wireless terminal has to store call information (e.g., outgoing/incoming information, call event occurring time, telephone number, etc.) at a predetermined storage whenever the call event is occurred.

Meanwhile, a conventional method for displaying the call record list in the wireless terminal includes reading the call record list in reverse order of the call event occurring time in response of the request of a user and displaying call-related information, e.g., icons of an outgoing call, an incoming call, a missed call, etc. and a telephone number in reverse-sequence of time as a list.

The detail steps will be described as follows.

FIG. 2 is a flowchart describing a conventional method for displaying a call record list in accordance with a preferred embodiment.

The wireless terminal stores the call record list in advance at the storage.

The wireless terminal receives a call record list searching request from the user at step S201, reads call information recorded in the call record list in order of recent time at step S203 and checks whether a name, of which telephone number is identical to the telephone number in the call record list, exists or not in a phone book at step S205. That is, an operation/control unit in the wireless terminal searches the phone book with the telephone numbers in the call record list and finds the identical telephone numbers.

If a name linked to a telephone number identical to the telephone number in the call record list exists in the phone book, the wireless terminal displays the relevant name and call record icons on a displaying unit (e.g., a liquid crystal display (LCD)) at step S207. If a name having a telephone number identical to the telephone number in the call record list does not exist in the phone book, the wireless terminal displays the telephone number and call record icons on the displaying unit at step S209. A screen of the displaying unit is shown in FIG. 3.

The wireless terminal checks whether the entire call record list is displayed on the displaying unit or not at step S206.

If the entire call record list is not displayed on the displaying unit, the processes from step S205 to Step S211 are repeated until the entire call record list is displayed on the displaying unit.

If the entire call record list is displayed on the displaying unit, the method is terminated. Also, if the call record list displayed on displaying unit as the maximum number, e.g., 8 call records, the method is terminated. Herein, the call record list can be displayed up to the maximum number.

Because the conventional method for displaying the call record list simply displays the call record list in sequence of the call event occurring time, the call information of the identical caller cannot be grasped clearly.

Also, because the conventional method provides only the incoming/outgoing call information, short message receiving information through a short message services (SMS) cannot be managed according to the caller.

Because the conventional method is limited by the maximum number of the displaying number on the screen at a time, the page number of the call record list can be increased due to the call information of the repeated and identical callers.

SUMMARY OF THE INVENTION

It is, therefore, an object of the present invention to provide a method for grouping call information and short message receiving information according to a caller and parallel displaying the grouped information corresponding to the caller when the call record list is displayed in the wireless terminal.

In accordance with an aspect of the present invention, there is provided a method for displaying a call record list in a wireless telecommunication terminal including the steps of: reading a stored call record list in response to a call record list searching request; collecting call records having identical caller information in form of a list in sequence of time; and displaying caller information together with more than one icon of the call records.

In accordance with another aspect of the present invention, there is provided a mobile terminal for displaying a call record list, including: a call record list reading unit for reading a stored call record list in response to a call record list searching request; a call record collecting unit for collecting call records having identical caller information in form of a list in sequence of time; and a list displaying unit for displaying caller information together with more than one call record icon indicating call record.

BRIEF DESCRIPTION OF THE DRAWINGS

The above and other objects and features of the present invention will become better understood with regard to the following description of the preferred embodiments given in conjunction with the accompanying drawings, in which:

FIG. 3 is a block diagram showing a conventional method for displaying a call record list in a wireless terminal in accordance with an embodiment of the present invention;

FIG. 4 is a flowchart describing a method for displaying a call record list in a wireless terminal in accordance with the embodiment of the present invention; and FIG. 5 is a block diagram showing a method for displaying a call record list in a wireless terminal in accordance with the embodiment of the present invention.

DETAILED DESCRIPTION OF THE

INVENTION

Hereinafter, a method for displaying a call record list in a wireless terminal will be described in detail with reference to the accompanying drawings.

Figure 1:
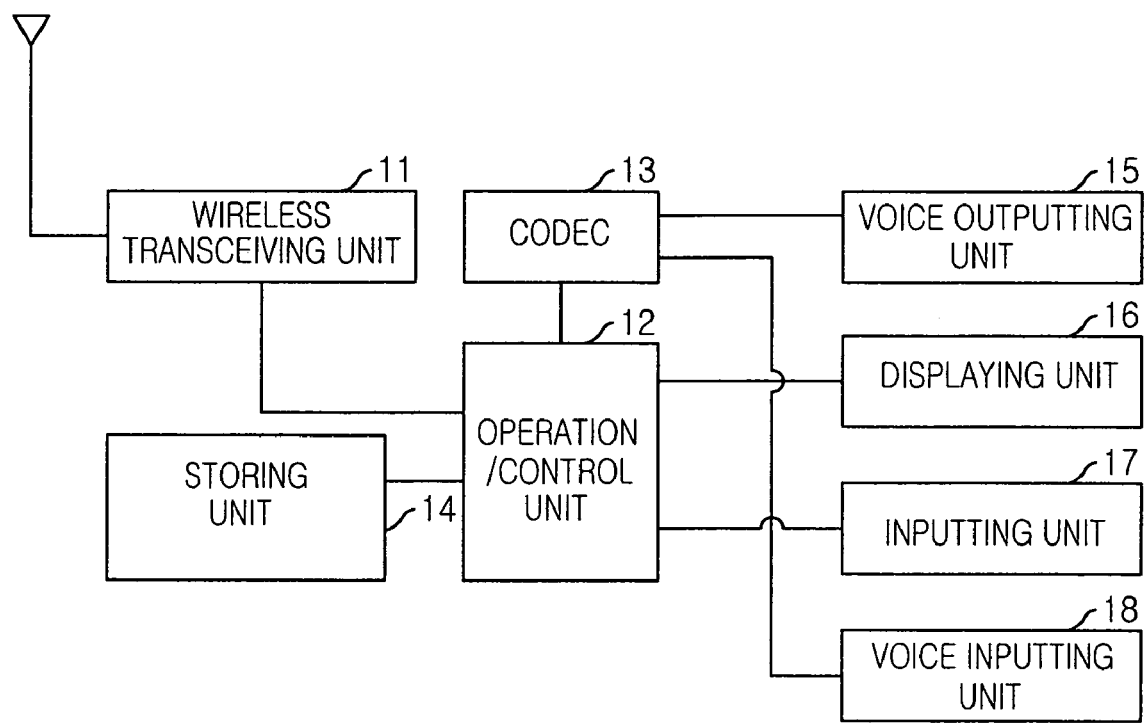
FIG. 1 is a block diagram showing a wireless terminal to which the present invention is applied.
Figure 2:
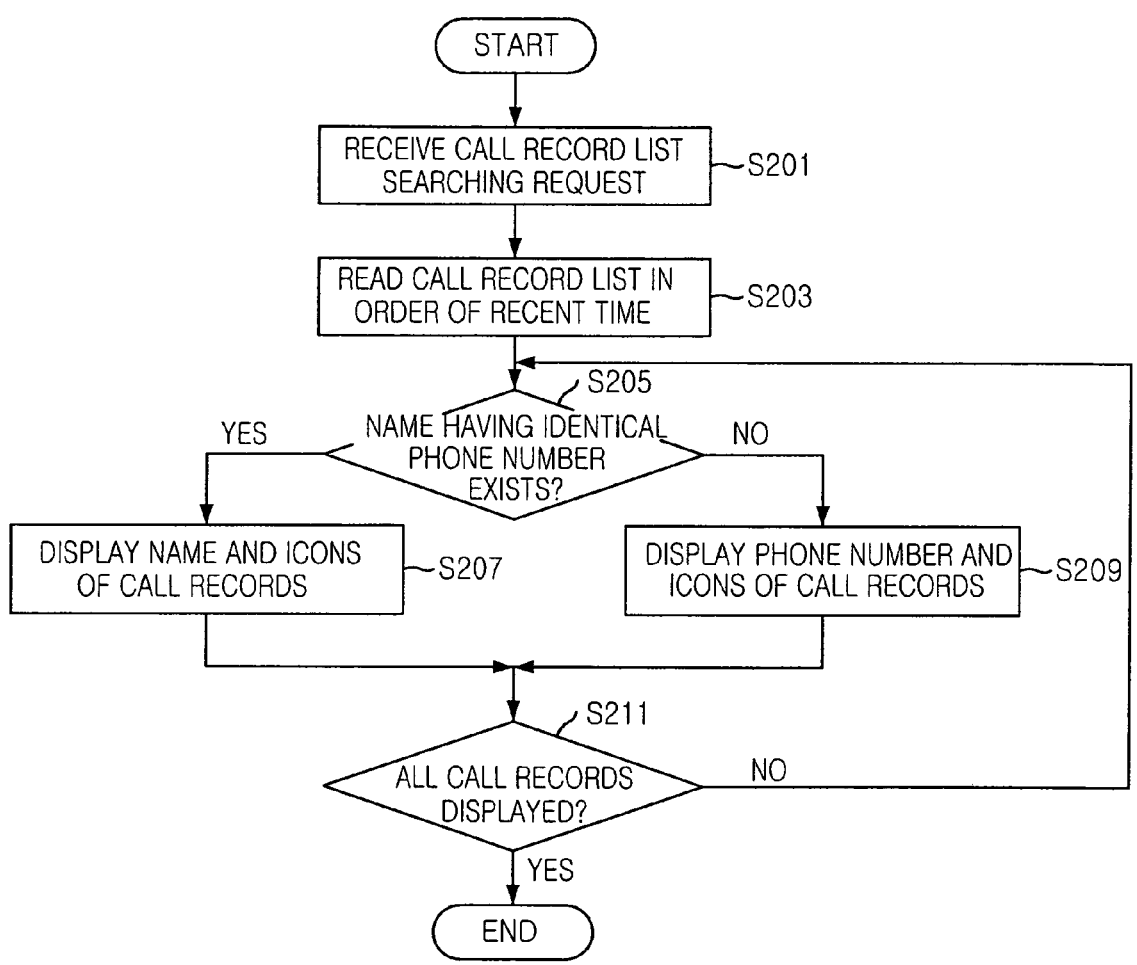
FIG. 2 is a flowchart describing a conventional method for displaying a call record list in a wireless terminal in accordance with the embodiment.

FIG. 1 is a block diagram showing a wireless telecommunication terminal (hereinafter, refer to as a wireless terminal) to which the present invention is applied.

As shown, the wireless terminal includes a wireless transceiving unit 11, an operation/control unit 12, a CODEC 13, a storing unit 14, a voice outputting unit 15, a displaying unit 16, an inputting unit 17 and a voice inputting unit 18.

The wireless transceiving unit 11 transmits and receives a signal in wireless through an antenna. The operation/control unit 12 drives/controls the wireless terminal, stores call information according to occurrence of the call event at a call record list storing area of the storing unit 14, reads the call record list stored at the storing unit 14 in order of recent time, i.e., in reverse sequence of call event occurring time in response to a request of searching the call record list and outputs the call record list through the displaying unit 16 by classifying what according to the caller. The CODEC 13 converts a signal received through the wireless transceiving unit 11 into a voice, outputs the voice to the voice outputting unit 15, e.g., a speaker according to a control by the operation/control unit 12. The CODEC 13 converts a received voice signal through the voice inputting unit 18, e.g., a microphone into an electric signal and transmits the electric signal to the operation/control unit 12 in order to transmit the signal through the wireless transceiving unit 11. The storing unit 14 stores a program driving the wireless terminal, a file system such as an image, a character and a icon, a telephone book, a call record list, etc. The voice outputting unit 15, e.g., a speaker outputs the voice signal received from the CODEC 13. The displaying unit 16, e.g., a LCD displays contents on a screen according to a control of the operation/control unit 12. The inputting unit 17, e.g., a keypad, receives a telephone number, menu selecting information, a call record list searching request, etc. The voice inputting unit 18, e.g., a microphone, receives a voice and transmits the received voice to the CODEC 13.

When the operation/control unit 12 displays the call record list, the operation/control unit 12 searches a received mailbox and displays short message receiving information of the caller. The operation will be described in detail with reference to FIGS. 4 and 5.

FIG. 4 is a flowchart describing a method for displaying a call record list in a wireless telecommunication terminal in accordance with the embodiment of the present invention.

The operation/control unit 12 receives the call record list searching request through the inputting unit 17 at step S401, reads the call record list stored at the storing unit 14 at step S403. The operation/control unit 12 collects call records having identical telephone number in the call record list as a call record list in reverse-order of the call event occurring time or in sequence of the call event occurring time at step S405. The operation/control unit 12 checks whether a name of which telephone number is identical to the telephone number of the call record list exists or not at steps S407. That is, the operation/control unit 12 searches a phone book with the telephone numbers and finds the identical telephone numbers.

If there is the name of which telephone number is identical to the telephone number in the call record list, the operation/control unit 12 displays the corresponding name and icons according to the call records of the call record list in order of predetermined sequence, i.e., in parallel at step S409. Herein, the call record includes the call event occurring information, e.g., incoming call information, outgoing call information, missed call information and short message receiving information, etc. and icons of each of the call records are predetermined.

If there is no name of which telephone number is identical to the telephone number in the call record list, the operation/control unit 12 displays the telephone number and icons according to the call record of the call record list in order of predetermined sequence, i.e., in parallel at step S411.

If the incoming call, the outgoing call, the missed call and the short message reception is occurred continuously to a duplicated caller or a duplicated telephone number, the operation/control unit 12 displays the corresponding icon and the number of the occurrence instead of parallel displaying corresponding icons repeatedly as the number of the occurrence. In particular, the icon of the missed call and the short message reception can indicate whether the user checks the call record or not. For example, if the user checks the call record, the icon of the call record is displayed in color, or if the user does not check the call record, the icon of the call record is displayed in shadow.

The operation/control unit 12 checks whether the entire call record list is displayed on the displaying unit 16 or not at step S413.

If the entire call record list is not displayed on the displaying unit, processes from step S405 to Step S413 are repeated until the entire call record list is displayed on the displaying unit 16.

If the entire call record list is displayed on the displaying unit, the displaying method is terminated. Also, if the call record list displayed on the displaying unit as the maximum number, e.g., 8 call records, the displaying method is terminated. Wherein, the call record list can be displayed up to the maximum number.

In the conventional method as illustrated in FIG. 3, the call information on Hong gil dong is serially displayed at the second lines 31, the fourth line 32 and the seventh line 33. However, in the present invention, referring to FIG. 5, the call information according to Hong gil dong is displayed in parallel at the second line 512. The user can select one of the parallel displayed icons using direction and selection keys and search detail call information (i.e., time information, incoming/outgoing call information, call time information, etc.), according to the selected icon. Because a process of the searching detail information is identical to the conventional method, the detail description will be skipped.

Meanwhile, in another embodiment, if there is a name which is stored at the phone book in the call record list, the call record having the name is displayed as follows.

The operation/control unit 12 reads the call record list in response of the call record list searching request received through the inputting unit 17 in reverse-order of the call event occurring time or in sequence of the call event occurring time. The operation/control unit 12 collects call records having identical caller information (i.e., the name or the telephone number) in the call record list as an call record list in reverse-order of the call event occurring time or in sequence of the call event occurring time and displays the caller information and the icons according to the call information of the call record list in order of the predetermined sequence, i.e., in parallel.

Therefore, according to the present invention, because the call information of the identical caller is displayed in parallel, the number of the call records, which can be displayed on the screen at a time, will be increased.

Because the conventional method for displaying the call record list simply displays the call record list in order of the call event occurring time, call information of the identical caller cannot be grasped clearly.

In accordance with the present invention, when the wireless terminal displays the call record list, the wireless terminal collects the call information and the short message receiving information of the identical caller as a group and displays the call information and the short message receiving information in parallel. In other words, not only the call information but also the short message receiving information can be grasped and managed simply according to the caller.

Also, because the wireless terminal displays the call information on the calls originated by the identical caller in parallel, the lines of the call record list displayed on the screen can be decreased, and the maximum call record number of the call record list displayed on the screen at a time can be increased, and the number of the pages of the call record list can be decreased.

The present application contains subject matter related to Korean patent application No. 2003-88563, filed in the Korean intellectual Property Office on Dec. 8, 2003, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method of displaying a call record list in a wireless telecommunication terminal, the method comprising:
   a) reading stored call records in response to a call record list searching request;
   b) collecting a plurality of call records associated with a caller in time sequence; and
   c) displaying information of the caller together with a group of multiple icons next to the caller information, wherein the multiple icons represent the plurality of the call records associated with the caller.

2. The method as recited in claim 1, wherein the step c) comprises:
   c1) referring to a phone book database of the terminal and checking whether a name is associated with a telephone number of the call records;
   c2) if there is a name associated with the telephone number of the call records, displaying the multiple icons next to the name of the call records in order of a predetermined sequence; and
   c3) if there is no name associated with the telephone number of the call records, displaying the multiple icons next to the telephone number in order of a predetermined sequence.

3. The method as recited in claim 2, wherein the call records comprises at least one call event selected from the group consisting an incoming call, an outgoing call, a missed call and a short message reception.

4. The method as recited in claim 3, wherein the steps c2) and c3) displays the multiple icons and the number of call events that are occurred consecutively.

5. The method as recited in claim 2, wherein the predetermined sequence is outputted in parallel.

6. A mobile terminal for displaying a call record list, comprising:

a call record list reading means for reading a stored call record list in response to a call record list searching request;
a call record collecting means for collecting a plurality of call records having identical caller information in the form of a list of records in time sequence; and
a list displaying means for displaying caller information together with a group of multiple icons next to the caller information.

7. The mobile terminal as recited in claim 6, wherein the list displaying means includes:
   a means for checking whether a name is associated with a telephone number of the call records; and
   an icon displaying means for displaying the multiple icons representing the plurality of call records, wherein if there is a name associated with the telephone number, the icon displaying means is configured to display the multiple icons next to the name of the call records, wherein if there is no name associated with the telephone number of the call record, the icon displaying means is configured to display the multiple icons next to the telephone number.

8. The mobile terminal as recited in claim 7, wherein the icon displaying means displays the icons of the call records and the number of call events occurring consecutively.

9. The mobile terminal as recited in claim 7, wherein the predetermined sequence is outputted in parallel.

10. A method of displaying recent calls in a telecommunication terminal, the method comprising:
    receiving a request for displaying recent calls;
    upon receiving the request, processing records of recent calls so as to identify two or more calls involving an identical person or telephone number; and
    displaying a list of recent calls, wherein the two or more calls involving the identical person or telephone number are displayed as an aggregate comprising multiple icons in the list of recent calls next to information identifying the person or telephone number, wherein the multiple icons represents the two or more calls and are displayed in time sequence of the two or more calls.

11. The method of claim 10, wherein the aggregate of the two or more calls is displayed as a single entry in the list.

12. The method of claim 11, wherein the icon is configured to identify the type of each call.

13. The method of claim 12, wherein the type of the call is selected from the group consisting of an incoming call, an incoming voice mail message, an incoming missed call, an incoming text message, an outgoing text message and an outgoing call.

14. The method of claim 10, wherein if two or more other calls involve another person or another telephone number, the two or more other calls are identified and displayed as an aggregate as well.

15. The method of claim 10, wherein in the aggregate, the two or more calls are displayed as sorted by the time of the occurrence of the calls.

16. The method of claim 10, wherein in the aggregate, the two or more calls are displayed as sorted by the type of the calls.

17. A mobile terminal, comprising:
    a memory configured to store recent call data;
    a processor configured to process the recent call data to identify two or more calls involving an identical person or telephone number from the recent call data; and
    a display connected to the processor and configured to display recent call information, wherein the two or more calls involving the identical person or telephone number are configured to be displayed as an aggregate comprising multiple icons in the list of the recent calls next to information about the identical person or telephone number, wherein the multiple icons are configured to represent the two or more calls and are configured to be displayed in time sequence of the two or more calls.

18. The mobile terminal of claim 17, wherein the display is further configured to display the recent call information such that the aggregate of the two or more calls is displayed as a single entry in the list.

* * * * *